July 28, 1936.  A. E. RUSS  2,048,819
COMPUTING APPARATUS
Filed June 28, 1932  3 Sheets-Sheet 1

INVENTOR.
Arthur E. Russ
BY Barlow & Barlow
ATTORNEYS.

July 28, 1936.  A. E. RUSS  2,048,819
COMPUTING APPARATUS
Filed June 28, 1932   3 Sheets—Sheet 2

INVENTOR.
Arthur E. Russ
BY Barlow & Barlow
ATTORNEYS.

July 28, 1936.　　　A. E. RUSS　　　2,048,819
COMPUTING APPARATUS
Filed June 28, 1932　　　3 Sheets-Sheet 3
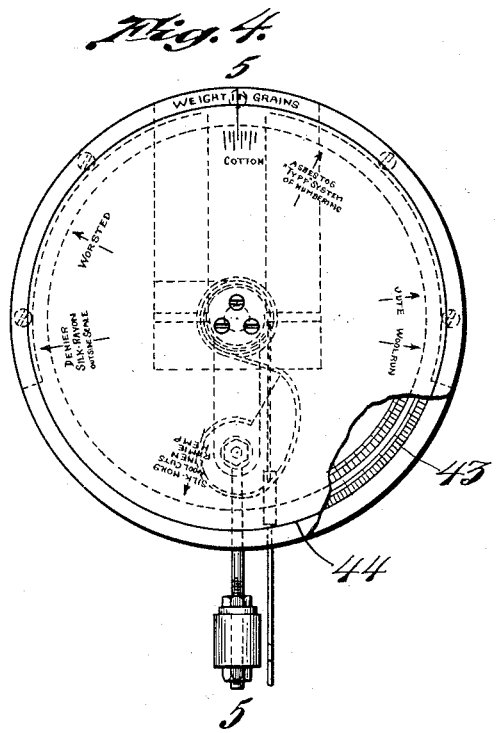
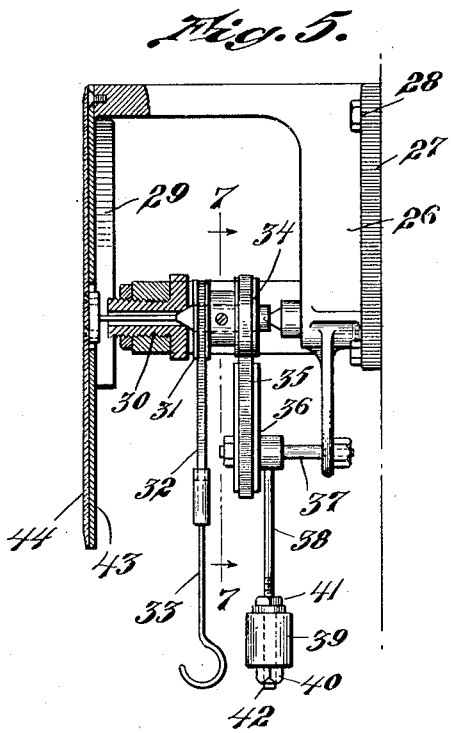
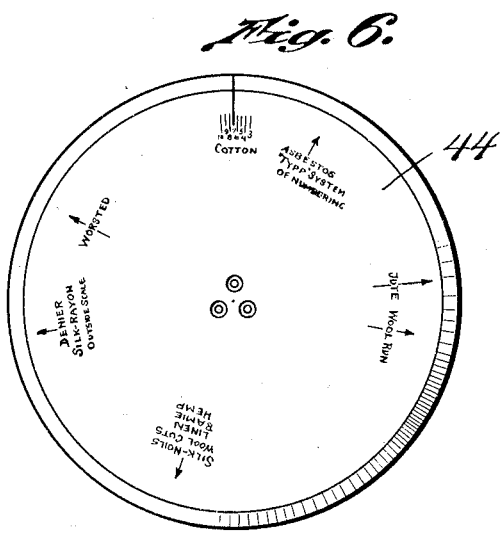
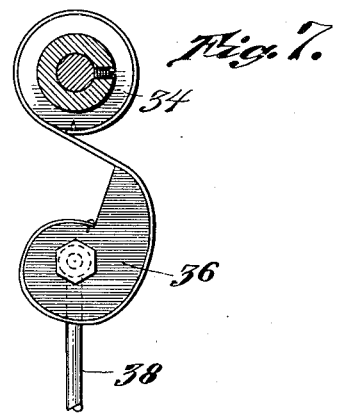
INVENTOR.
Arthur E. Russ
BY Barlow & Barlow
ATTORNEYS.

UNITED STATES PATENT OFFICE 2,048,819

COMPUTING APPARATUS

Arthur E. Russ, Providence, R. I., assignor to Henry L. Scott Company, a corporation of Rhode Island Application June 28, 1932, Serial No. 619,689

5 Claims. (Cl. 235—84)

This invention relates to an apparatus for computation of data relative to materials such as the size, weight or the like thereof.

One object of the invention is the provision of means for computing such sizes and weights, taking into consideration the percentage of moisture absorption by the material.

Another object of the invention is the provision of a device for computing the sizes of yarns from their weight.

Another object of the invention is the provision of an apparatus by which like diameters or sizes of yarn may be compared in different material so that where a knitter or weaver for example is changing from one material to another he may quickly and accurately determine the yarn size in any system comparable with that which he knows.

Another object of the invention is the provision of an apparatus which will compute the number of one thousand yards per pound in any given size number of yarn.

A further object of the invention is the determination of the above results in a combined weighing and computing apparatus so that a given length of yarn of fixed size specimen of fabric may be hung on the apparatus and its size or weight read off directly upon the obverse face of the apparatus.

With these and other objects in view, the invention consists of certain novel features of construction, as will be more fully described, and particularly pointed out in the appended claims.

In the accompanying drawings:—

Figs. 4 and 8 illustrate this apparatus or computing scale as used in a weight apparatus.

Fig. 5 is a sectional view on line 5—5 of Fig. 4.

Fig. 6 is a plan view and further detail of the computing scale.

Fig. 7 is a sectional view on line 7—7 of Fig. 5.

Figure 1:
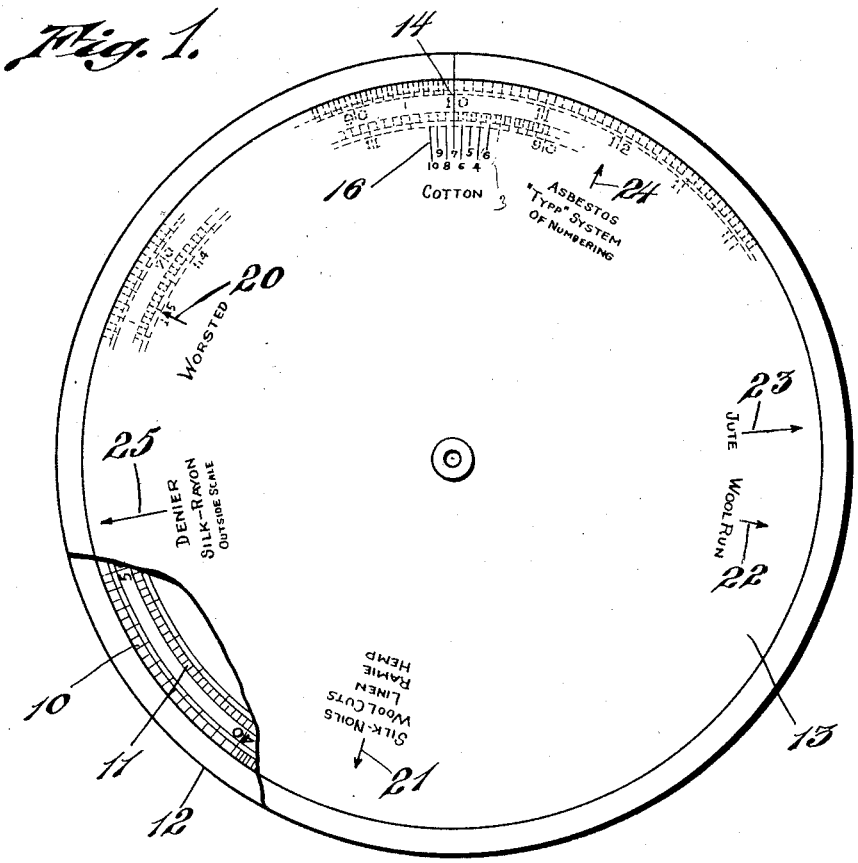
Fig. 1 is a top plan view of the computing device of this invention, with portions broken away.
Figure 2:
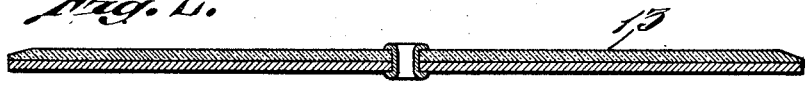
Fig. 2 is a central sectional view thereof.

The systems of sizing yarn materials vary in the number of yards per pound for each different material. For instance, number 1 cotton has 840 yards in one pound, number 1 worsted has 560 yards in one pound, and so on, different with each material. There are also 7,000 grains troy in one pound, avoirdupois; consequently, for convenience in the sizing of cotton yarn, the 840 yards and the 7,000 grains troy weight are both reduced by dividing by 7 so that the considered ratio for No. 1 cotton yarn is 120 yards of this size yarn weigh 1,000 grains, and thus in order that the size of any cotton yarn may be determined 120 yards of this cotton yarn is weighed in grains and divided into 1,000, which quotient equals the number of the size of the yarn.

Figure 3:
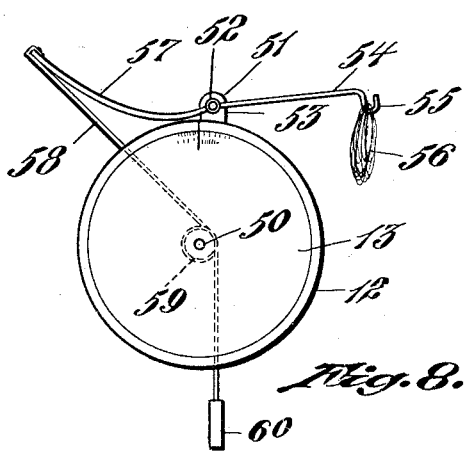
Fig. 3 is a plan view of the back member of the device.
Figure 3:
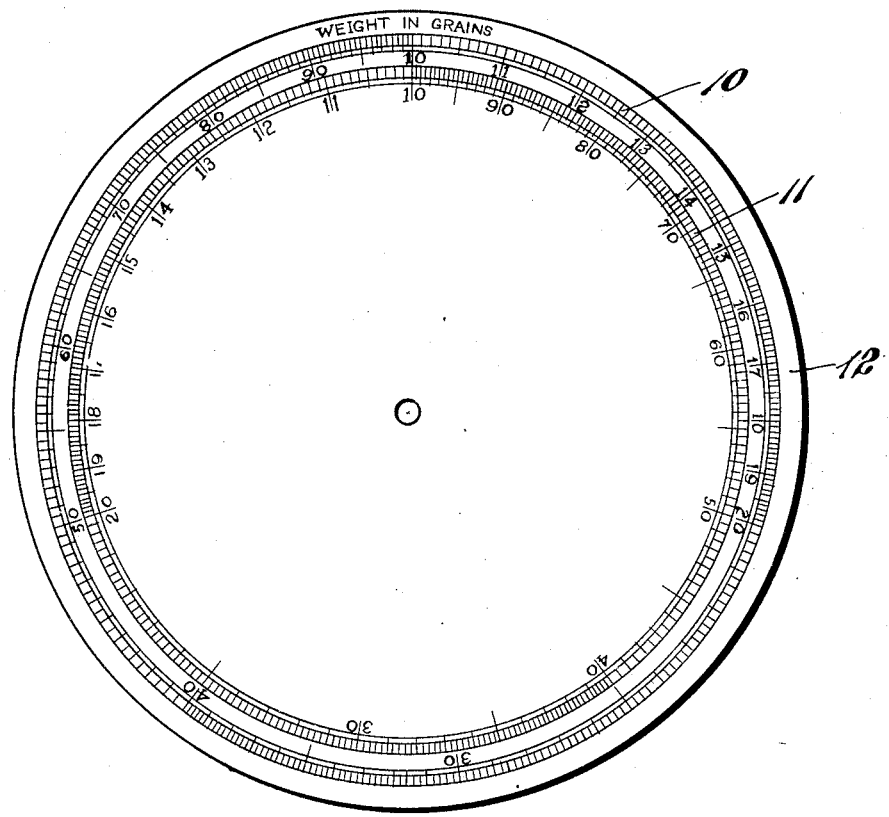

The above is the usual mathematical calculation performed to obtain this result, and in order that I may produce this calculation in an apparatus and thus reduce the necessity and possibility of error in figuring, I have arranged two logarithmic scales in circular formation, running from 10 to 100 or in any multiple of these figures with one scale reading in one direction and the other scale reading in the opposite direction, both starting at the 10 position, and by this arrangement, as shown in Fig. 3, one scale 10 reads progressively upwardly in a clockwise direction, while the scale 11 reads progressively in a counter-clockwise direction, the latter scale being arranged concentrically within the scale 10.

By this arrangement of logarithmic scales I obtain the definite relation of dividing any numbers on the outer scale into one thousand so that the quotient may read directly upon the inner scale, and by providing a sliding member 13 of transparent material with an indicium 14 thereon, I assist in guiding the eye by setting the same at the known weight. To use this device, I may weigh 120 yards of cotton and set this indicium 14 on the scale 10, corresponding to the amount this 120 yards weighs in grains and then I may read on the scale 11 beneath the mark 14 the size number of cotton yarn which this specimen conforms to. For instance, if 120 yards of the specimen weighed 20 grains I would set the mark 14 at 20 and read beneath the mark 14 on the scale 11 the size 50 which corresponds to the size number of cotton which this specimen conforms to.

Up to this point in the description I have made no mention of moisture content of cotton which plays a very important part in the determination of size. There has been adopted in the trade a standard which calculates cotton as containing 7% moisture upon which bases all sizes and figures concerning cotton yarn are determined. Thus, if the specimen which I have weighed contains other than 7% moisture, the yarn size which I have determined beneath the indicium 14 must be corrected, and in order that manual calculation need not be resorted to in this instance, I have laid out on the dial 13 at each side of the mark 14 other markings or indicia 16 which correspond in dimension or space to a percentage of the logarithmic scale for calculation of moisture at either side of the indicium 14 representing the 7% standard basis of determination. Accordingly, should the specimen weighed come to 20 grains and contain but 3% moisture, I would then read for the number yarn the corrected amount beneath the designations 3 of the markings 16 and find that the number yarn was 48 in the adopted standard scale instead of 50; likewise I would determine the variation should the moisture content be 8, 9 or 10 or above the standard of 7%, and it would be unnecessary for me to separately and manually compute the percentage variation which usually occurs in the determination of the size which has been weighed in an atmosphere causing the yarn to have absorbed different than the standard amount of 7%. There is in use a standardizing balance which will afford a person an accurate indication of the percentage of moisture which the yarn would normally contain in the atmosphere in which it is being weighed for sizing purposes.

It is often desirable in the making of certain textile fabrics to change from one material, such as cotton, to another material such as worsted, for which a different size basis is used. In the size numbering of these different materials, as above pointed out, 840 yards of No. 1 cotton weigh 1 lb., while 560 yards of No. 1 worsted weigh 1 lb. or 80 yards of No. 1 worsted weigh 1,000 grains troy, and to reduce this to the standard of 120 yards adopted for cotton, it will be found that 120 yards of No. 1 worsted weigh 1,500 grains troy. Accordingly, in order to determine the size of worsted in the same manner as cotton, it would be necessary to divide the weight in grains of 120 yards of worsted into 1,500 to determine the size of worsted of the standard system. In order that I may directly compare the yarn size of cotton and worsted, I have arranged an indicating mark 20 upon the dial 13, spaced from the indicating mark 14 an amount equal to the logarithmic relation between the corresponding weights of cotton and worsted, which in this particular instance happens to be 50%, and if I wish to learn the number of worsted which compared to No. 50 cotton yarn I would set the indicium 14 on 50 of scale 11 and would by direct observance on my apparatus, read 75 at which the pointer 20 showed which would give me a yarn of the same diameter as my No. 50 cotton, or in other words No. 75 worsted and No. 50 cotton are of the same size or weight. Therefore, in order that I might continue the fabric which I was weaving or knitting without a change of its thickness I would adopt by this comparative method a yarn of the corresponding size as above illustrated.

At the present time there has been no universally adopted moisture content standard for any system other than cotton and accordingly I have not placed upon this dial, markings similar to 16, for determining the variation of percentage moisture in any system except cotton but similar markings may be placed about the several points for any standard that may be desired.

Similarly upon other size bases, I calculate and position the marks 21 for wool cuts, 22 for wool run, 23 for jute, 24 for asbestos, etc. In the materials which I have above mentioned, cotton, worsted, and the like, the larger the size number of the yarn the smaller is the yarn. However, in silk, rayon or jute the system is the reverse in that the larger the number of the yarn the larger is the diameters of the yarn, and as a standard for silk which has come over from the metric system, 4,464,528 yards of No. 1 silk or rayon are necessary to make up 1 lb. on this basis. By the use of the two oppositely progressing logarithmic scales, I compare the size of silk or jute and the size of worsted, cotton or other materials mentioned by reading the size for the silk and jute on the outside scale 10 under indicium 25 rather than on the inside scale 11 as in these previous cases; this relation occurring because of the opposite progression of size between silk or rayon or jute and the other mentioned materials, the opposite relation adapting the device for this particular use.

There is also coming into use the thousand yards per pound system of numbering, called the Typp system, the name of the system being made up from the first initial of each of these words, and as this system is but one digit greater than the asbestos numbering which has 100 yards of No. 1 yarn per pound, the system would be positioned on the dial 13 at the same place as that of the asbestos indicia 24, and I may use this system by assuming added cyphers on the number indicated. Thus if the number 42 appeared on the scale it would be read 42,000. This Typp system of marking also affords a means by which calculations may be determined for the thousand yards per pound which will be obtained in any given number of yarn. For instance in the indication of the dial in Fig. 1 with the marker 14 showing No. 50 cotton it can be determined by taking off on the scale under the indicia 24 that there are 42,000 yards of this size cotton per pound, and this will also hold true for any of the other sizes of other materials indicated on the dial 13, which indicates an additional valuable use of this device. Also vice versa, it may be determined the number of the yarn which it will take to make up a thousand yards per pound, which may be easily determined by swinging the dial 13 to the desired position along the logarithmic scales beneath it.

This apparatus which I have illustrated may be a hand manipulated affair and require the weighing of the specimen in grains troy after which the manipulation of the dial will give the desired results by setting the indicium 14, if cotton, or the selected other indicium, depending upon the material to be weighed in grains, as indicated on the pointer scale and reading beneath this indicator on the appropriate scale the size number of the yarn so weighed.

I may combine the weighing device and the apparatus above mentioned in an apparatus which is supported by a bracket 26 adapted to be secured to a suitable support 27 by bolts 28. An arm 29 extends down from the front edge of the bracket and provides a support for an adjustable cone bearing 30. Between this bearing and a tapered bearing on the bracket, I rotatably support drums 31 and 34 fixed to rotate together. A strap 32 extends about drum 31 and depends to support or connect to the hook 33 for engaging the specimen to be weighed or sized. A strap 35 extends over drum 34, which strap also extends about a cam 36 which is secured to a shaft 37. Upon this shaft 37 is mounted a weight arm 38 with a weight 39 at one end thereof to counterbalance parts of this device. This weight may be adjusted between nuts 40 and 41 on the threaded end 42 of this arm. As the arm 38 swings from a vertical plane the weight 39 becomes more effective to require a greater pull thereon for further movement. The cam 36 is arranged so as to vary the effective leverage or weight of the arm by varying the point of pull from the center of rotation, and thus this cam is so shaped as to cause the rotary movement of the drum to be translated into increments corresponding to the logarithmic relation of the graduations on a chart 43 which is fixed to the arm 29 or bracket 26, while the dial 44 moves and corresponds to the disc 13 illustrated, it being understood that the dial 43 is provided with scales 10 and 11 thereon.

By this counterbalancing means of the specimen the weight of the specimen is translated directly into grains and by reading the scale under the proper marking or indicium 14, 20, 21, 22, 23, 24 or 25, the results are obtained directly without the necessity of manipulating the apparatus first described after weighing.

In other words the weight of 120 yards of the specimen placed upon the hook 33 is immediately ascertained on the scale 10 and the size number is immediately ascertained on the scale 11 by reading the scales at the point therebeneath, such as beneath the indicium 14, if cotton, 20 if worsted, and so on.

Another form of weighing apparatus with which my computing device may be used is shown in Fig. 8 in which the dials 12 and 13 may be mounted upon a convenient axle 50 with the part 12 fixed and the part 13 rotatably mounted in a manner similar to that shown in Fig. 5 above described. A lever 51 is pivoted as at 52 upon some suitable bracket 53. The arm 54 of the lever has a hook 55 to support the specimen 56 to be weighed. The arm 57 is cam shape and to its end there is attached a strap 58 which has one or more turns about the pulley 59 and then extends to suspend the counterweight 60. In this arrangement as the specimen swings the lever 51 a greater retarding will be applied as the specimen swings the arm 57 due to the shortening of the point of application of the weight as will be apparent.

It will be understood that such percentage markings as indicated at 16 may be applied in any scale, testing device or other calculating instruments where the increments of measurements are laid out in a predetermined spaced relation such as a logarithmic relationship.

Also this same system may be used to determine the weight of material by the running yard from a small sample of a previously adopted size standard.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:—

1. In a calculating device, a pair of relatively movable members, inner and outer separate fixed logarithmic scales provided on one of said members progressing in opposite directions from a single datum line, a set of index marks relating to different standards of value provided on the other of said members and spaced according to the characteristics of said values, one of said index marks cooperating with the outer scale and another of said index marks cooperating with the inner fixed scale on a single setting of said movable members, and additional index marks located close to one of said index marks and having a definite mathematical relation with reference thereto.

2. In a calculating device, a pair of relatively movable circular disk members, two separate fixed continuous logarithmic scales on one disk member, an index mark relating to a certain commodity on the other disk member and a series of supplemental index marks adjacent said index mark and having a definite mathematical relation thereto, said supplemental index marks cooperating with one of said fixed scales on said other relatively movable member and said commodity mark to indicate proportionate increments of the value indicated by said commodity mark.

3. In a calculating device, a pair of relatively movable members, two separate fixed logarithmic arcuate scales provided on one of said members progressing in opposite directions from a single datum line, a set of index marks relating to different standards of value provided on the other of said members and spaced thereon according to the characteristics of said values and in an invariable angular relation to one another, one of said index marks cooperating with one of said fixed scales and another of said index marks cooperating with the other fixed scale on a single setting of said movable members.

4. In a dial for a weighing or testing device, a pair of relatively movable circular members, a fixed scale provided on one of said members, a set of index marks relating to different standards of value provided on the other of said members and spaced according to the characteristics of said values and in an invariable angular relation to one another, one of said index marks cooperating with one point on said scale and another index mark cooperating with another point on said scale, said index marks having a definite mathematical relation one to the other in the terms of said fixed scale.

5. In a calculating device, a pair of relatively rotatable circular disk members superimposed one over the other for movement about a common central axis, two concentric fixed continuous logarithmic scales provided on the inner disk member and progressing in opposite directions from a single datum line, a plurality of radial index marks relating to different standards of value provided on the upper disk member adjacent to its peripheral edge and spaced according to the characteristics of said values and in an invariable relation to one another, one of said index marks being used in conjunction with both of said fixed scales and the other index marks being arranged in opposite directions therefrom around the disk periphery with one of the marks thereof cooperating with the outside fixed scale and the remaining marks thereof cooperating with the inside fixed scale on a single setting of said disk members.

ARTHUR E. RUSS.